(12) United States Patent
Toth

(10) Patent No.: US 6,318,639 B1
(45) Date of Patent: Nov. 20, 2001

(54) THERMOSTAT WITH TEMPORARY FAN ON FUNCTION

(75) Inventor: Bartholomew L. Toth, St. Louis., MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/418,714

(22) Filed: Oct. 15, 1999

(51) Int. Cl.⁷ .................................. F23N 5/20; F24F 7/00
(52) U.S. Cl. ..................... 236/46 R; 236/49.3; 62/231; 165/244
(58) Field of Search ..................... 165/244, 238; 236/49.3, 46 R; 62/231; 454/233, 258

(56) References Cited

U.S. PATENT DOCUMENTS

| | | | |
|---|---|---|---|
| 3,635,044 | 1/1972 | Heth | 62/151 |
| 4,298,946 | 11/1981 | Hartsell et al. | 236/91 D |
| 4,299,096 | 11/1981 | Van Camp | 62/180 |
| 4,838,482 | * 6/1989 | Vogelzang | 165/244 X |
| 5,000,382 | 3/1991 | Stedman | 236/46 R |
| 5,230,482 | 7/1993 | Ratz et al. | 236/47 X |
| 5,547,017 | * 8/1996 | Rudd | 165/244 |
| 5,582,233 | 12/1996 | Noto | 165/247 |
| 5,611,484 | 3/1997 | Uhrich | 236/46 R |
| 5,881,806 | * 3/1999 | Rudd | 165/244 |

* cited by examiner

*Primary Examiner*—William Wayner
(74) *Attorney, Agent, or Firm*—Harness, Dickey & Pierce, P.L.C.

(57) ABSTRACT

An electronic programmable thermostat having different modes of fan operation, including an automatic mode, a time mode, and a continuous mode, preferably includes a temporary fan-on mode for selecting a predetermined period of time for enabling operation of a climate control system including an air circulating fan. The period of time for operation of the temporary fan on mode is selected from a plurality of predetermined periods of time. The temporary mode of operation preferably can be selected during any other mode of operation and after the expiration of the selected period of time for temporary fan on operation, the thermostat returns to the mode of operation of the fan that it should be in based on a programmed schedule of the thermostat. Selection of a predetermined period of time and activation of the temporary mode results in operation of the air circulating fan for that selected period of time.

20 Claims, 6 Drawing Sheets

THERMOSTAT WITH TEMPORARY FAN ON FUNCTION

FIELD OF THE INVENTION

The present invention relates to thermostats, and in particular, to electronic programmable thermostats having different modes of operation for enabling operation of a climate control system including an air-circulating fan.

BACKGROUND OF THE INVENTION

Electronic digital thermostats typically have one or more programmable modes of fan operation. These modes may include an automatic mode based on temperature-related demands or requirements of the heating/cooling system, a time mode based on the time of day and a continuous mode for continuous operation. These thermostats commonly include user interfaces or programming pads for selecting among the available modes of operation.

A variety of thermostats, including ones with multiple modes of operation, are known in the art for controlling heating/cooling systems and air circulation systems. However, none of the previously available thermostats gave the user the option to turn the fan on, upon demand, for a preselected period.

The ability to turn the fan on and make it operate continuously for a preselected period, regardless of temperature or time, would give the user improved control over the environment. The user could ensure that the fan adequately ventilates the room, independent of temperature and time, and the user need not remain to turn the fan off.

What has been needed is a thermostat with an easily selected mode to operate the fan upon demand for a preselected period (and preferably one of a plurality of preselected periods).

SUMMARY OF THE INVENTION

The thermostat of the present invention provides a temporary fan-on mode of operation. The temporary fan-on mode allows the user to select one of a plurality of preselected periods to operate the fan. The fan will turn on upon demand by the user, will run for the preselected period regardless of the temperature or time, and will turn off without intervention by the user.

According to one aspect of the present invention, an improved thermostat is provided for controlling the operation of a climate control system including an air-circulating fan. The thermostat provides at least one of the following user-selectable modes of operating the fan: an automatic mode in which the air-circulating fan is operated based on temperature-related demands of the heating/cooling system; a time mode in which the air-circulating fan is operated based on the time of day; and a continuous mode in which the air-circulating fan is operated continuously. The improvement to the thermostat is a user-selectable temporary fan-on mode of operating the air-circulating fan in which the air-circulating fan is operated upon demand for a preselected period of time. The period of time for operation of the temporary fan-on mode is selectable from a plurality of predetermined periods of time. The temporary fan-on mode of operation preferably can be selected during any other mode of operation and after the expiration of the preselected period of time for temporary fan-on operation, the thermostat returns to the mode of operation of the fan that it should be in based on the programmed schedule of the thermostat.

According to another aspect of the present invention, a thermostat for controlling the operation of a climate control system including an air-circulating fan is provided with a temporary fan-on mode of operation for selectively operating the air circulating fan for a preselected period of time. The temporary fan-on mode is provided in addition to at least one of the following other user-selectable modes of operation: an automatic mode in which the air circulating fan is operated based on temperature-related demands of the heating/cooling system; a time mode in which the air-circulating fan is operated based on the time of day; and a continuous mode in which the air-circulating fans is operated continuously. The time period for the temporary fan-on mode is selected from a plurality of predetermined periods of time. In this aspect, the thermostat preferably includes a control for selecting the temporary fan on mode of operation and a control for preselecting the period of time. The control for preselecting the period of time is a control for preselecting one of a plurality of predetermined periods of time and the control for preselecting the period of time is activated upon operation of the control for selecting the temporary fan-on mode. The control for preselecting one of a plurality of predetermined periods of time scrolls through a series of pre-determined periods of time. The temporary fan-on mode of operation preferably may be selected during any other mode of operation. Additionally, after expiration of the preselected period of time, the thermostat preferably returns to the mode of operation of the fan that it should be in based on the programmed schedule of the thermostat.

According to still another aspect of the present invention, a method is provided for controlling a climate control system that includes an air-circulating fan in which the fan is operated in at least one of an automatic mode wherein the fan is operated based on temperature-related demands of the heating/cooling system; a time mode wherein the fan is operated based on the time of day; and a continuous mode wherein the fan is operated continuously. The method comprises the step of selectively operating the fan in a temporary fan-on mode, with the fan operating for a preselected period of time during the temporary fan-on mode. A further step includes, after expiration of the preselected time, returning the thermostat to the mode of operation of the fan that it should be in based on the programmed schedule of the thermostat. The step of selectively operating the fan in a temporary fan-on mode preferably includes the steps of selecting one of a plurality of predetermined periods of time for the fan-on mode and overriding any other mode of operation upon activation of the temporary fan-on mode.

Therefore, the present invention provides numerous novel features and advantages over prior thermostats. In particular, the invention provides a user selectable temporary fan-on mode of operation to a thermostat. The temporary fan-on mode provides the thermostat with a mode of operation to control a climate control system including an air-circulating fan, such that the fan is operated upon demand for a preselected period of time determined by a user. The temporary fan-on mode provides the user with a quick and easy option to select a specific predetermined period of time for operation of the fan and prevents undesired fan operation, which may occur when a user selects a continuous mode of fan operation and forgets that the thermostat is in the continuous mode.

These and other features and advantages will be in part apparent and in part pointed out in a more detailed description of the various embodiments and aspects of the invention as set out below.

DETAILED DESCRIPTION OF THE PREFERRED EMBODIMENTS

Figure 1:
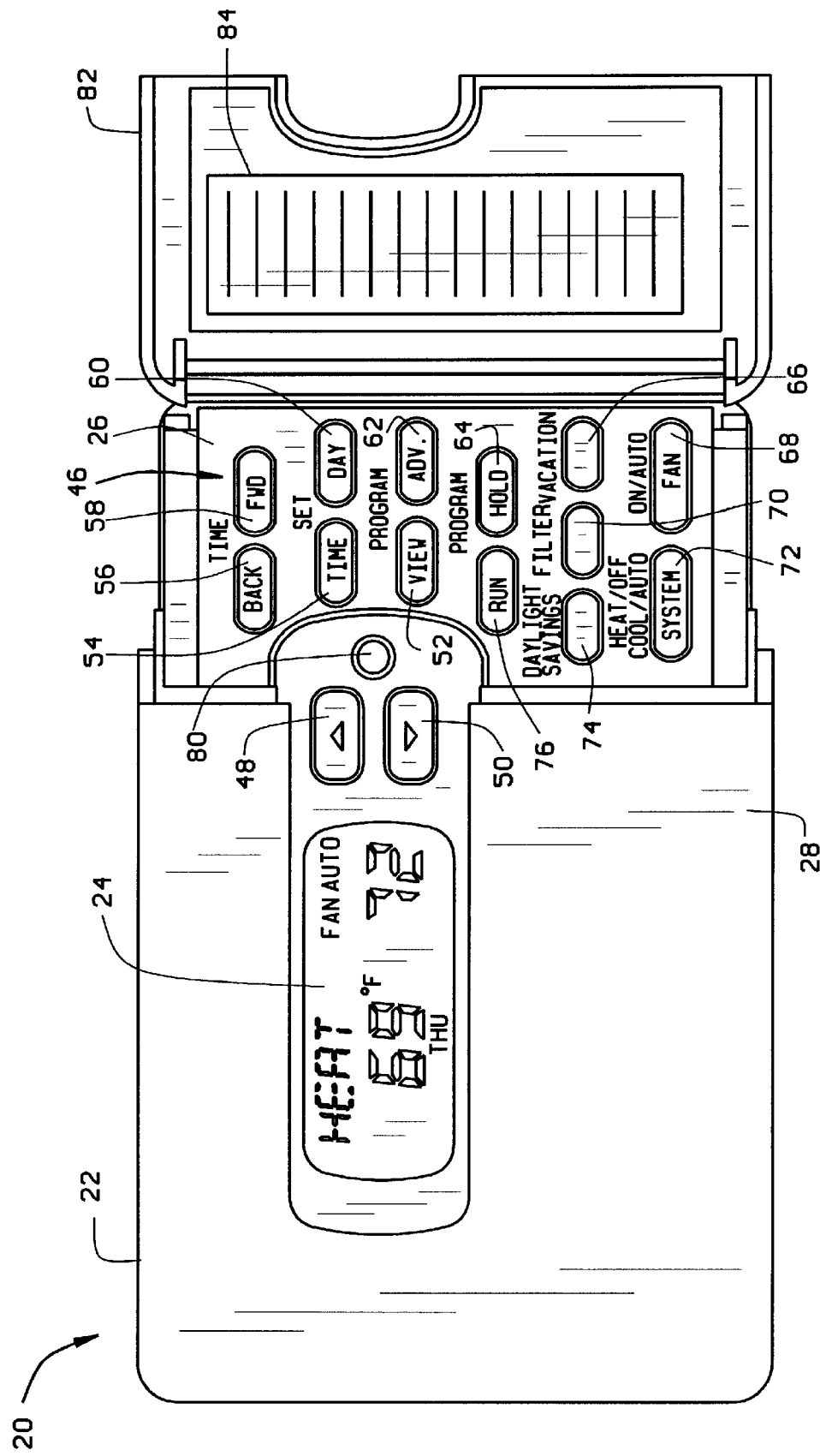
FIG. 1 is a front plan view of a thermostat constructed according to the principles of the present invention.

A thermostat having selectable features or modes, including an improved user selectable mode of fan operation, is designated generally by reference numeral 20 in FIG. 1. The thermostat 20 is generally of the type adapted to be connected to a climate control system, such as a heating or cooling system for controlling the climate control system. Among other things, the thermostat controls the air-circulating fan of the climate control system. In the preferred embodiment, the thermostat 20 is an electronic digital thermostat having a generally box shaped housing 22 and provided with a liquid crystal display (LCD) 24 and a key pad 26 on a front face 28 of the thermostat housing 22. The LCD display 24, which preferably displays status information or programming information, preferably comprises four display characters or digits 30 for displaying time, display characters 32 for indicating whether the time is AM or PM, two digits 34 for displaying temperature information, display characters 36 for indicating the temperature scale, display characters 38 for indicating the day of the week, display characters 40 for indicating system condition information, display characters 42 for indicating status information, and display characters 44 for indicating the mode of operation. The keypad 26 is preferably provided with buttons or keys 46 for selecting and programming the desired functions of the thermostat 20.

Figure 2:
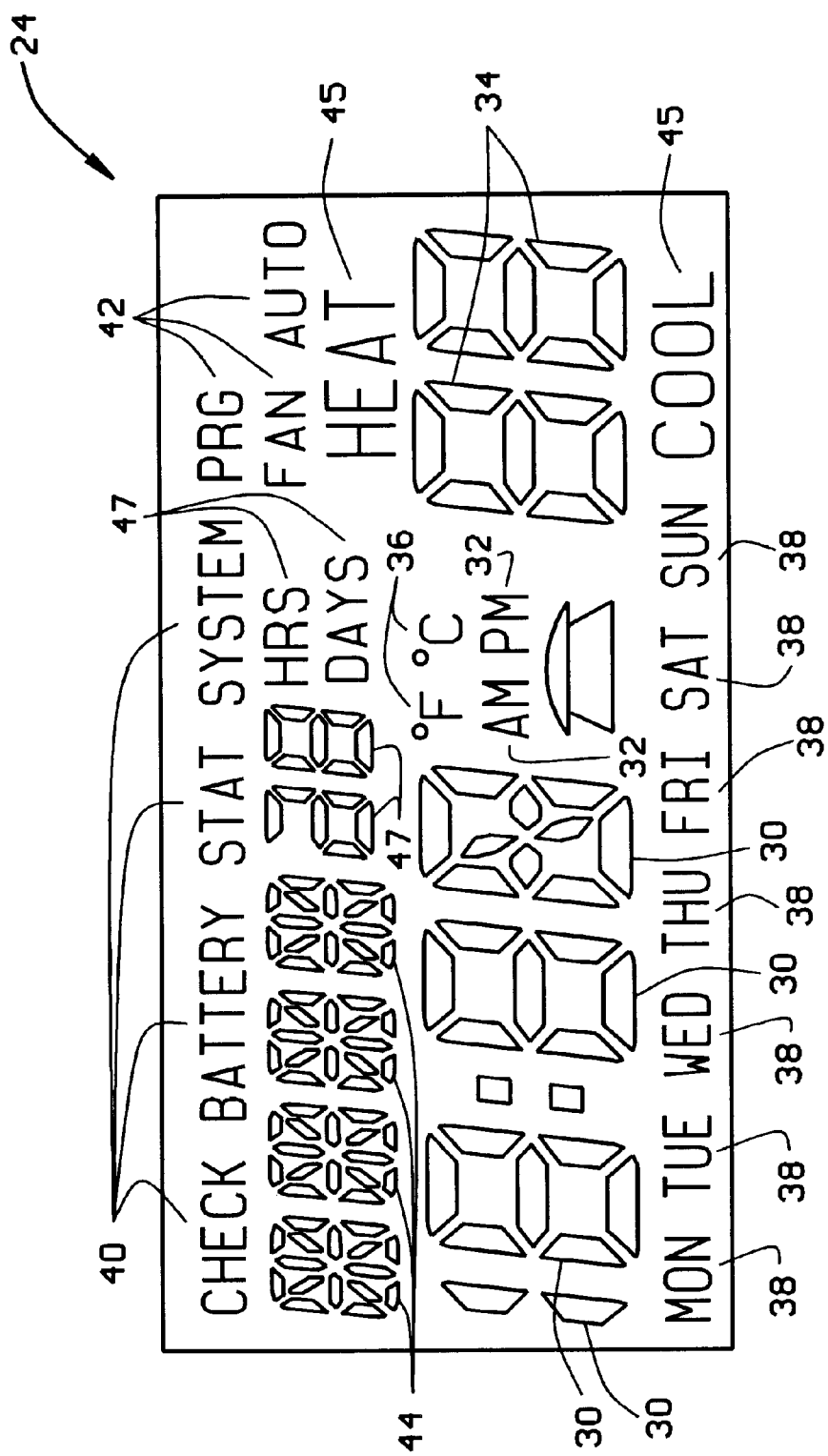
FIG. 2 is an exploded view of the liquid crystal display of the thermostat in FIG. 1.

The four digits 30 preferably display the current time. Additionally, the right two digits of the four digits 30, as viewed in FIG. 2, may display the room temperature. The thermostat 20 may be constructed such that the current time of day and current room temperature are alternately displayed by the four digits 30. When the LCD display 24 is displaying the time of day, characters 32 display AM or PM as appropriate. Characters 34 display the set-point temperature as programmed by a user, characters 36 display whether the temperature is indicated in either Fahrenheit or Celsius, and characters 38 display the current day of the week or, during programming mode, display the day(s) being programmed.

Characters 40 display system condition information including CHECK BATTERY when the batteries, preferably "AA" alkaline batteries provided as a power back-up, are weak and should be replaced, BATTERY when the thermostat is running on battery power only, CHECK STAT when a problem is detected by the thermostat 20 within itself, and CHECK SYS or CHECK SYSTEM when the thermostat 20 detects certain problems in the heating and cooling system. Characters 42 display status information including FAN ON when the fan is operating continuously, FAN AUTO when the fan cycles with the heating or cooling system determined by user programmed temperature settings and PRG FAN ON when the fan is running in the aforementioned time mode based on the time of day, or in accordance with the improvement of the present invention, when the fan is running for a predetermined period of time selected by a user.

Characters 44 display the mode of operation of the thermostat 20 including HEAT during heating mode, COOL during cooling mode, AUTO during automatic modes of operation, HOLD during periods of manual user override to hold the thermostat setting at a selected temperature, VACA when vacation mode is activated, and OFF when the thermostat 20 is inoperative. Additionally, during programming mode, characters 44 display the time period being programmed, such as MOR for morning, DAY for daytime, EVE for evening and NHT for nighttime. Characters 44 also display information one word at a time during user configuration modes, such as PRGM MODE when the thermostat 20 is in a programming mode. Additional display characters 45 may also be provided for displaying HEAT or COOL, during heating or cooling modes, respectively, if characters 44 are displaying other information. Finally, time period display characters 47 are provided to display user selected time periods, including the selected time period for the temporary fan-on mode in accordance with the improvement to the thermostat 20.

A user can view thermostat information on the LCD display 24 and can program the operation of the thermostat using the buttons 46 of the keypad 26. The desired operation of the thermostat 20 is programmed by a user who enters information by depressing the buttons 46 according to specific parameters or specifications as described in more detail below.

The buttons 46 preferably include an up arrow button 48, a down arrow button 50, a "VIEW" program button 52, a "TIME" set button 54, a "BACK" button 56, a "FWD" button 58, a "DAY" set button 60, an "ADV" program button 62, a "HOLD" program button 64, a "VACATION" button 66, a "FAN" button 68, a "FILTER" button 70, a "SYSTEM" button 72, a "DAYLIGHT SAVINGS TIME" button 74 and a "RUN" program button 76.

The buttons 46 are operated by a user to program and operate the numerous functions of the thermostat. The up arrow 48 raises the set point temperature and the down arrow 50 lowers the set point temperature, which temperature is displayed by the characters 34. The "VIEW" program button 52 initiates or reviews programming of the thermostat 20. The "TIME" set button 54 is used along with the "BACK" button 56 and "FWD" button 58 to set the thermostat clock, which time is displayed by the four digits 30. The "BACK" button 56 adjusts the time setting backward and the "FWD" button 58 adjusts the time setting forward. The "DAY" set button 60 is used to set the current day, which is displayed by characters 38. The "BACK" button 56 and "FWD" button 58 are used to select the day.

The "ADV" program button 62 is used to advance operation to the next program mode. The "HOLD" program button 64 is used to manually override programming of the thermostat 20 and maintain the thermostat 20 setting at a selected temperature. The "VACATION" button 66 is used to enter and configure a vacation mode of operation, such as when a user leaves his home for a period of time and cannot view and program the thermostat 20 daily.

As will hereinafter be described in more detail, the "FAN" button 68 selects the mode of operation for an air-circulating fan of the climate control system attached to the thermostat 20.

The "FILTER" button 70 is used to reset a filter change-out time or to select a time at which a filter attached to the climate control system for filtering impurities before the air is circulated throughout a building, is to be changed. A warning indicating CHECK SYS will be displayed by status information characters 40 when the time period expires and the filter needs replacement.

The "SYSTEM" button 72 is used to set the mode of operation of a climate control system controlled by the thermostat 20. Selection preferably can be made between a heating mode, a cooling mode, an off mode or an automatic mode depending on a user's preference and as required by the conditions. For example, during the winter season, or during periods of cold outside temperatures, the "SYSTEM" button 72 may be used to select the heating mode of operation, which results in the thermostat 20 controlling a heating system attached thereto. Characters 44 display this mode of operation of the thermostat 20 as HEAT on the LCD display 24.

The "DAYLIGHT SAVINGS BUTTON" 74 adjusts the clock setting of the thermostat 20 forward or backward one hour. This feature is useful when the time of day is changed an hour due to daylight savings. Finally, the "RUN" program button 76 is operative to start or return to a programmed mode of operation.

When reference is made to using or operating one of the buttons 46, or when reference is made that one of the buttons 46 is operative to perform some function, it should be understood by one skilled in the art that this refers to a user pressing one of the buttons 46 that corresponds to the specific programming request desired. The button may be an actual depressible button or simply a pressure or contact sensitive button or any other input device. The LCD display 24 displays information which is manually entered by a user pressing the desired buttons 46 for programming the thermostat 20.

The thermostat of the present invention is provided with a light button 78, which when depressed, activates a light source to illuminate the LCD display 24. The light source may be a conventional light bulb, a light emitting diode (LED), an electroluminescent member, or any other suitable light source providing for viewing the LCD display 24 during low light conditions. The thermostat 20 also includes an operating indicator 80 that is illuminated by the thermostat 20 when the thermostat 20 or a climate control system attached to the thermostat 20 is operating.

Figure 3:
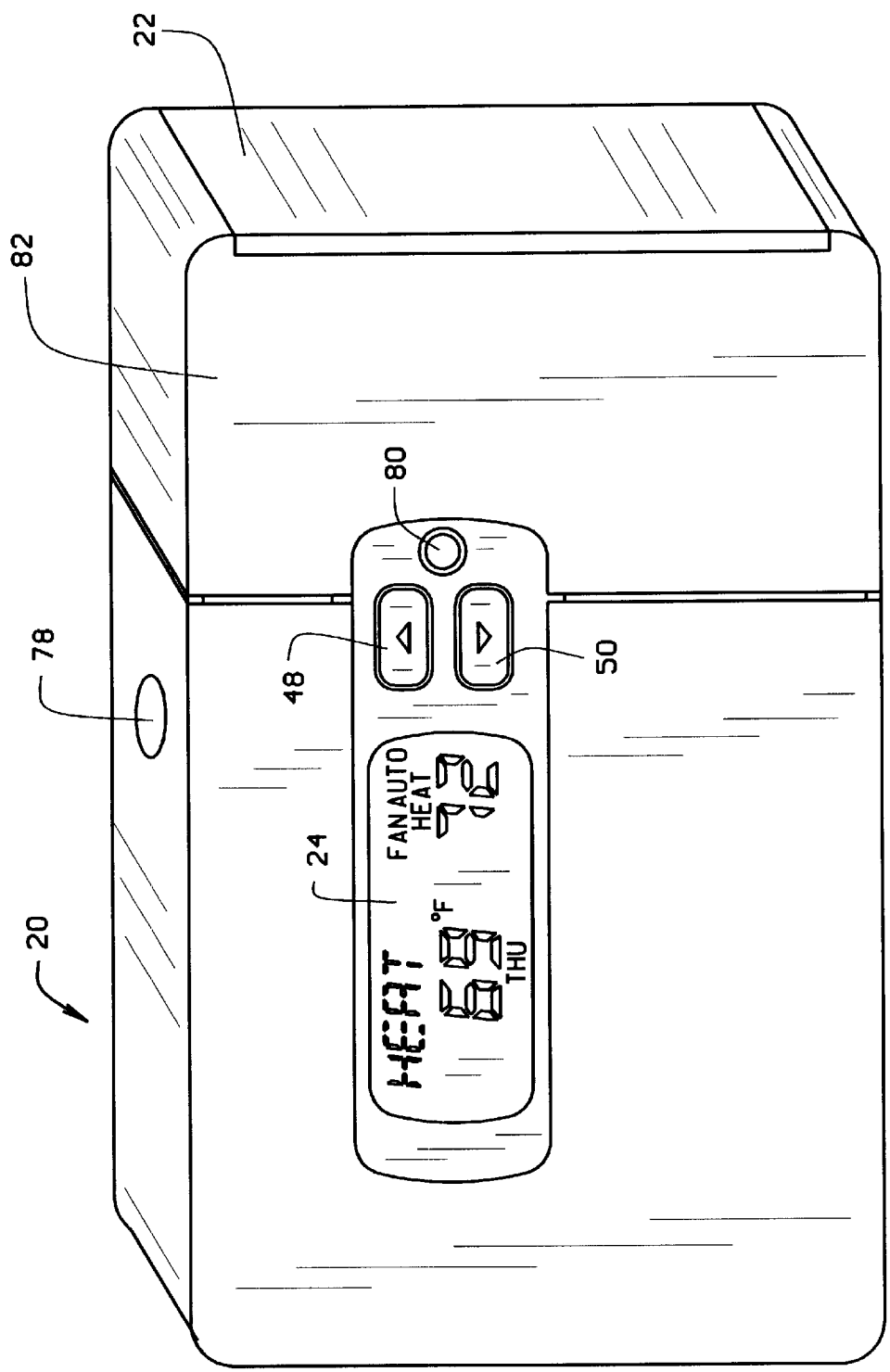
FIG. 3 is a perspective view of the thermostat of FIG. 1, with the thermostat cover closed.

A cover 82 is hingedly attached to the right-hand side of the thermostat 20, as viewed in its open position in FIG. 1, such that a user can close the cover over the keypad 26, as shown in FIG. 3, thereby hiding the buttons from view, preventing inadvertent operation of the buttons, and protecting the buttons 46 from exterior elements, such as dirt and dust. A programming guide or chart 84 may be provided on an inside face 86 of the cover 82 to aid a user and facilitate programming of the thermostat 20.

Figure 4:
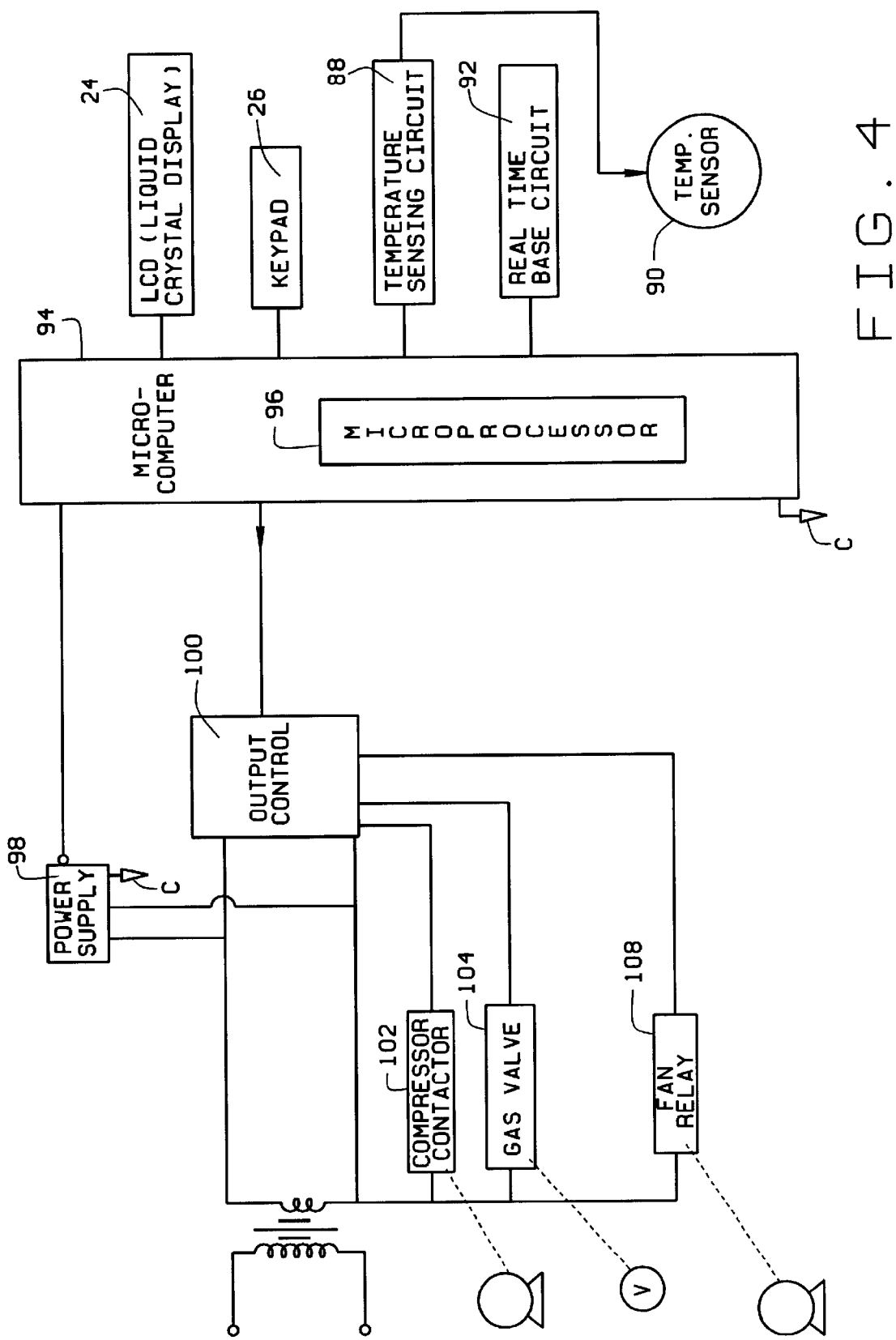
FIG. 4 is a block diagram of the circuit of the thermostat of FIG. 1.

In addition to the external components of the thermostat, namely the LCD display 24, the keypad 26 and buttons 46, the thermostat 20 is provided with internal component parts for controlling operation of the thermostat 20. The electronic control components of the thermostat 20 of the present invention are preferably provided as shown in FIG. 4. A temperature sensing circuit 88 is provided to accept temperature input signals from a temperature sensor 90 connected to the thermostat 20. The temperature sensor 90 may be provided as part of the thermostat 20 and/or may be provided in a separate location, for example in a different room, and connected by wire or a Radio Frequency (RF) transmitter-receiver. The temperature sensing circuit 88 provides the thermostat 20 with information to determine whether user selected set-point temperatures have been achieved and therefore operation of an attached heating and/or cooling system should be turned on or off. Additionally, the temperature information (i.e., current temperature of the room in which the temperature sensor 90 is located) may be provided by the digits 30 of the LCD display 24.

A real-time base circuit 92 is provided to control time-based operations of the thermostat 20. A microcomputer 94 including at least a microprocessor 96 is provided to accept and process input signals from the keypad 26 with its buttons 46, input signals from the temperature sensing circuit 88 and input signals from the real-time base circuit 92. The microcomputer 94 thereafter provides control of a heating and/or cooling system attached to the thermostat 20. A power supply 98 is provided to power the thermostat 20, and in particular, the electronic components of the thermostat.

The microprocessor 96 analyzes the input signals and provides an output signal to an output control 100 which provides control of other component parts for operating an air-circulating fan of a heating and/or cooling system attached to the thermostat 20. As shown in FIG. 4, the thermostat 20 provides control of a heating and cooling system attached thereto. However, as pointed out, the thermostat 20 can control any air-circulating system connected to it, including a cooling system only, a heating system only, a heat-pump system, or a multistage system. The thermostat 20, as shown in FIG. 4, further includes a compressor contactor 102, a gas valve 104, and a fan relay 108, which together provide for controlling the operation, including the enabling and disabling, of the heating and cooling system.

To this point, the description of the thermostat 20 has been of a type having typical component parts, such as the series 1F90 thermostats sold by White-Rodgers Division of Emerson Electric Co. It should be apparent to one skilled in the art that the thermostat 20 heretofore described may be modified and variations may be provided, such that the improvement described below may be included with the thermostat 20 as well as any thermostat for controlling operation of a climate control system, and in particular, to one controlling operation of a climate control system having an air-circulating fan.

Generally, thermostats of the type herein described operate on twenty-four volts, and are provided with a user interface, such as the keypad 26 and the LCD display 24, for enabling multiple modes of operation for controlling a climate control system, such as an air circulation system including a fan connected thereto. The thermostat is normally operatively electrically coupled to the air circulation system. The thermostat may be hard wired to the climate control system, or otherwise operatively connected, for example, with RF transmitters or receivers. Typically, the user interface provides for selecting and programming the mode of operation of the thermostat including time and temperature settings. The thermostat 20 of the present invention preferably includes at least one of three programmable modes of operation: (1) an automatic mode providing for operation of the air circulation system based on temperature-related demands of the heating/cooling system; (2) a time mode providing for operation of the air circulation system based on time; (3) a continuous mode providing for continuous operation of the air circulation system; together with a temporary mode providing for operation of the air circulation system on demand for a preselected predetermined period of time. Programming is generally accomplished using the keypad 26 and depressing the buttons 46 according to the specific feature desired.

Figure 5:
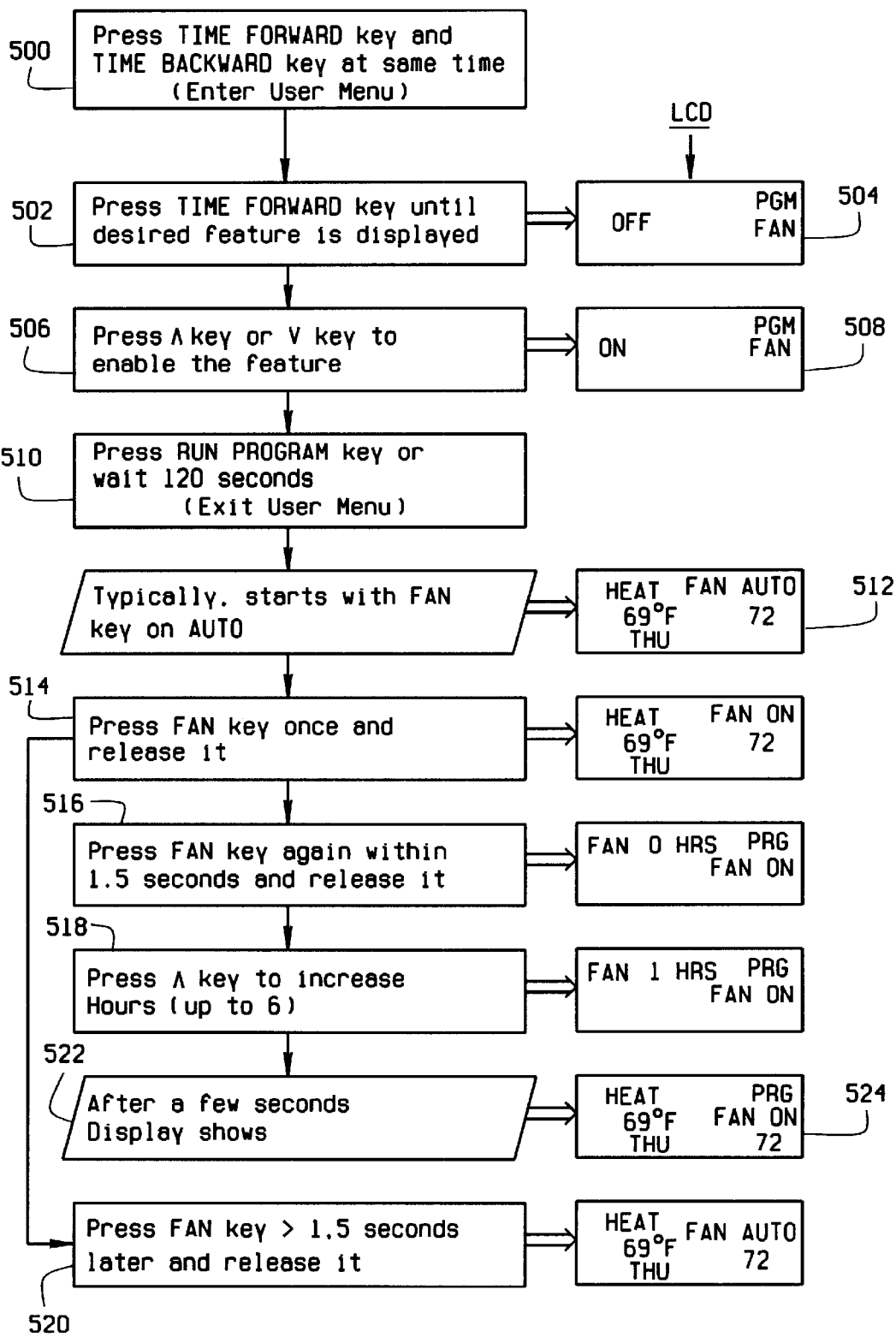
FIG. 5 is a flow chart of the thermostat function.
Figure 6:
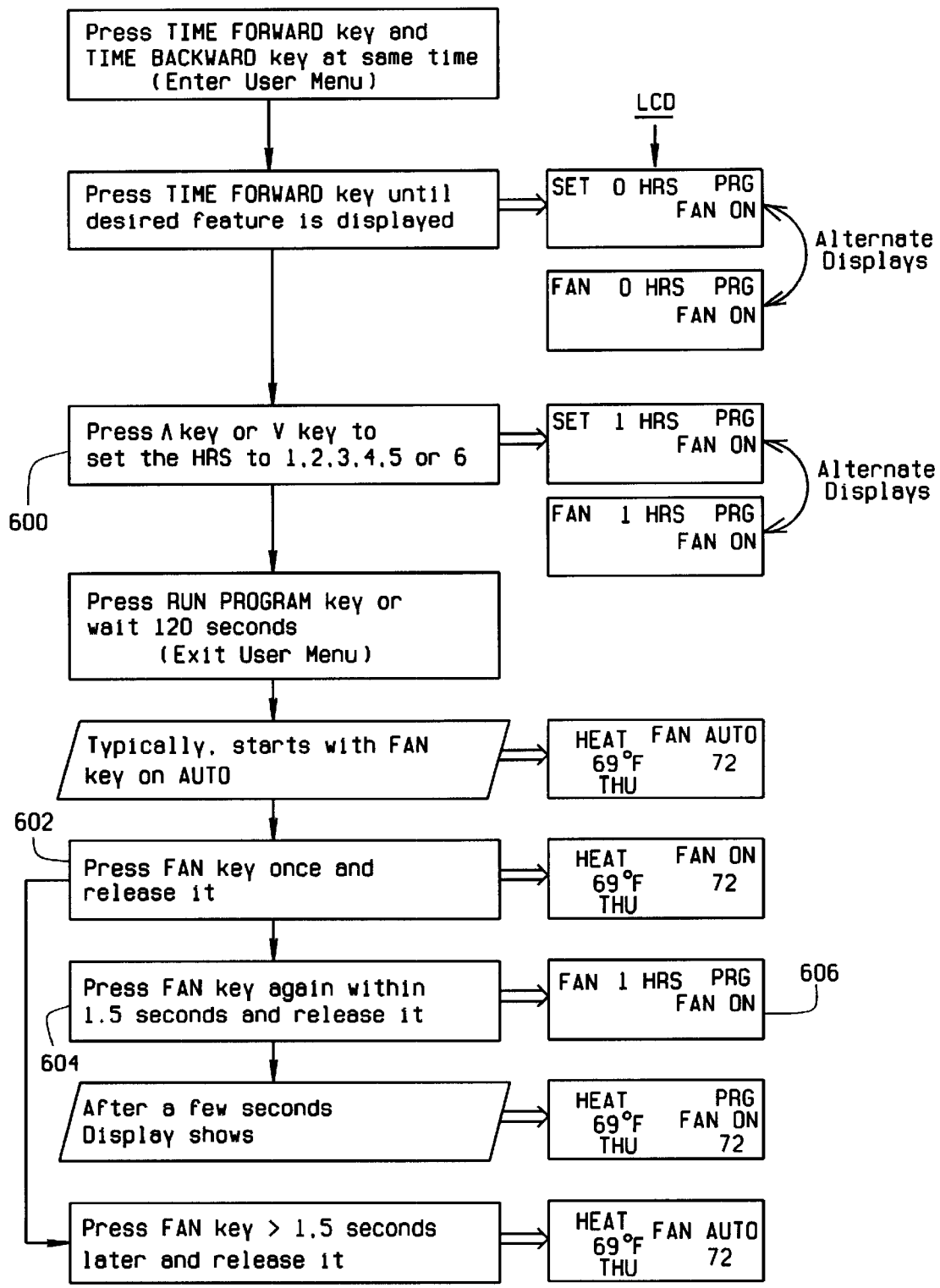
FIG. 6 is a flow chart of an alternative embodiment of the thermostat function.

The operation of the thermostat 20 is controlled by a user programming the thermostat using the keypad 26 and the LCD display 24. The thermostat 20 is thereby operated according to user input settings. FIGS. 5 and 6 show the steps of programming of the thermostat 20 for the temporary fan-on mode of operation of the present invention. The blocks on the left side of FIGS. 5 and 6 represent user depression of specific buttons 46 and the blocks on the right side represent the LCD display 24 after the buttons 46 have been depressed.

Preferably, a user desiring to program the thermostat 20 depresses the BACK button 56 and FWD button 58 simultaneously to enter a user menu mode as shown in block 500. The BACK or FWD button 56 or 58 is then depressed to select the desired feature in the menu. Each depression of either button 56 or 58 causes the LCD display 24 to scroll forward or backward through the possible operating modes, one at a time. For example, in block 502, the "FWD" button 58 is depressed until the display of block 504 appears. Then, depressing the up arrow button 48 or down arrow button 50 enables the mode or feature of block 504. Specifically, in block 506, the up arrow button 48 or down arrow button 50 is pressed to toggle the displayed mode of PRG FAN from OFF in block 504 to ON in block 508. Thus, in block 508, the temporary fan-on feature is shown as being enabled or selected. Subsequently depressing the RUN program button 76 exits the user menu at block 510 and returns the LCD display 24 to a normal display at block 512 showing the system condition information 40 (HEAT), the FAN status information 42 (FAN AUTO), alternate time and ambient temperature on characters 30, set point temperature on characters 34 and day of the week on characters 38. Alternatively, the thermostat 20 may be provided such that at the expiration of a specific time period (i.e. 120 seconds), the LCD display 24 automatically exits the user menu and reverts back to the normal display.

Enabling (or selecting) the temporary fan-on mode of operation, according to the improvement of this invention, while the LCD display 24 is in the user menu, allows for subsequently programming the thermostat 20 to provide control of the operation of an air-circulation system connected to the thermostat 20 based on a user selected predetermined period of time.

To program the thermostat 20 to provide a desired period of operation of the fan in the temporary fan-on mode of operation, once the temporary fan-on mode is selected in the user menu and the RUN program button 76 is depressed to exit the user menu mode, a user depresses the FAN button 68 once at block 514, and then within a specified time period, preferably one and a half seconds, the user depresses the FAN button 68 once again at block 516, thereafter enabling a user to select one of several predetermined periods of time for operation of the thermostat 20 by pressing the up arrow button 48 to increase the hours from 0 to 6 as shown in block 518 (Depressing the FAN button 68 a second time after the specific time period at block 520 results in the LCD display 24 returning to its normal mode and the user must again depress the FAN button 68 twice before entering the time period selection mode). Therefore, the first depression of the FAN button 68 at block 514 will cause the LCD display 24 to display FAN ON and the second depression of the FAN button 68 at block 516 will cause the LCD display 24 to display PRG FAN ON on display characters 42. Pressing the up arrow and down arrow buttons 48 and 50 now allow for selecting one of a predetermined periods of time for operation of an air-circulation system connected to the thermostat 20, which time period will be displayed on display characters 47. The thermostat may provide for selection of time periods in minutes or hours, or a combination of both, depending upon the application for which the thermostat 20 is being used.

FIG. 5 illustrates the selection of a predetermined period of operation based on hours. After the user selects the desired period of operation, the LCD display 24, after preferably a few seconds as shown at block 522, will return to its normal display at block 524, and the temporary fan-on mode will be activated. The LCD display 24 will continue to display PRG FAN ON on display characters 42 to indicate that the temporary mode is active. This temporary fan-on mode overrides normal control and operation of the fan for the selected predetermined time. After the period of time selected by the user for the temporary fan-on mode of operation expires, the thermostat 20 will return to the mode of operation of the fan that it should be in based on the programmed schedule of the thermostat.

A user desiring to change the predetermined period of operation of the temporary fan-on mode simply presses the FAN button 68 twice at blocks 514 and 516, as previously described, and selects another predetermined period of operation. The temporary mode of operation is selectable during any other mode of operation, and once activated, overrides that mode of operation for the selected predetermined period of time. Additionally, depressing the FAN button 68 once while in the temporary mode of operation, deactivates the mode and changes the mode of operation to the automatic mode; depressing the FAN button 68 a second time changes the mode of operation to the continuous mode; depressing the FAN button 68 a third time changes the mode of operation back to the temporary fan-on mode.

In an alternative embodiment of the temporary fan-on mode of operation, as shown in FIG. 6, the user selected predetermined period of operation is selected while in the user menu using the up arrow button 48 or down arrow button 50 as shown in block 600. Thereafter, depressing the FAN button 68 twice within a specific time period at blocks 602 and 604 will enable the temporary mode and provide operation of the air-circulation system attached to the thermostat 20 for the selected predetermined period of time. Upon the second depression of the FAN button 68, the LCD display 24 will temporarily display at block 606 on display characters 47 the selected predetermined period for which the thermostat 20 will operate the air-circulation fan. In this embodiment, after expiration of the selected predetermined time period, the thermostat 20 will likewise return to the mode of operation of the fan that it should be in based on the programmed schedule of the thermostat. In this embodiment, the user must enter the user menu again if a different predetermined time period for the temporary mode of operation is desired.

Therefore, a user wishing to turn on an air-circulating system for a predetermined period of time, simply enters a user programming mode, selects this feature, thereafter selects the predetermined time period for operation and enables the temporary mode.

While the present invention has been described by reference to specific embodiments, it should be understood and apparent to those skilled in the art that modifications and variations of the invention may be constructed without departing from the scope of the invention. However, these changes and modifications are included within the teaching of the disclosure, and it is therefore intended that the invention be limited only by the scope of the claims appended hereto, and their equivalents.

What is claimed is:

1. In a thermostat for controlling the operation of a climate control system including an air-circulating fan, the thermostat providing at least one of the following user-selectable modes of operating the fan: an automatic mode in which the air-circulating fan is operated based on temperature-related demands of the climate control system; a time mode in which the air-circulating fan is operated based on the time of day; and a continuous mode in which the air-circulating fan is operated continuously, the improvement comprising a user-selectable temporary fan-on mode of operating the air-circulating fan in which the air-circulating fan is operated only once for a pre-selected period of time.

2. The thermostat according to claim 1 wherein the preselected period of time is one of a plurality of predetermined periods of time.

3. The thermostat according to claim 1 wherein the temporary fan-on mode can be selected during any other mode of operation.

4. The thermostat according to claim 3 wherein the thermostat includes a programmed schedule and wherein after the expiration of the preselected period of time of the temporary fan-on mode, the thermostat returns to the mode of operation that it should be in based on the programmed schedule of the thermostat.

5. The thermostat according to claim 4 wherein the preselected period of time is selected from a plurality of predetermined periods of time.

6. A thermostat for controlling the operation of a climate control system including an air-circulating fan, the thermostat providing a temporary fan-on mode for selectively operating the air circulating fan only once for a pre-selected period of time in addition to at least one other user-selectable mode of operation selected from: an automatic mode in which the air circulating fan is operated based on temperature-related demands to the climate control system; a time mode in which the air-circulating fan is operated based on the time of day; and a continuous mode in which the air-circulating fan is operated continuously.

7. The thermostat according to claim 6 wherein the preselected period of time is one of a plurality of predetermined periods of time.

8. The thermostat according to claim 6 wherein the thermostat includes a control for selecting the temporary fan on mode of operation, and a control for preselecting the period of time.

9. The thermostat according to claim 8 wherein the control for preselecting the period of time is a control for preselecting one of a plurality of predetermined periods of time.

10. The thermostat according to claim 9 wherein the control for preselecting the period of time is activated upon operation of the control for selecting the temporary fan-on mode, and wherein the control for pre-selecting one of a plurality of predetermined periods of time scrolls through a series of pre-determined periods of time.

11. The thermostat according to claim 10 wherein the temporary fan-on mode can be selected during any other mode of operation.

12. The thermostat according to claim 11 wherein the control for preselecting one of a plurality of predetermined periods of time is deactivated if no period of time is selected by a user.

13. The thermostat according to claim 12 wherein the control for preselecting one of a plurality of predetermined periods of time is changeably selectable at any time prior to activation of the air circulating fan in the temporary fan-on mode of operation.

14. The thermostat according to claim 12 wherein the control for preselecting one of a plurality of predetermined periods of time is changeably selectable during the temporary fan-on mode of operation.

15. The thermostat according the claim 14 wherein the control for selecting the temporary fan or mode is changeably selectable to select another user-selectable mode of operation during the temporary fan-on mode of operation.

16. The thermostat according to claim 6 wherein the thermostat includes a programmed schedule and wherein after the expiration of the preselected period of time of the temporary fan-on mode, the thermostat returns to the mode of operation that it should be in based on the programmed schedule of the thermostat.

17. In a method of controlling a climate control system including an air-circulating fan in which the fan is operated in at least one of an automatic mode wherein the fan is operated based on temperature-related demands of the climate control system, a time mode wherein the fan is operated based on the time of day, and a continuous mode wherein the fan is operated continuously, the improvement comprising the step of selectively operating the fan in a temporary fan-on mode in which the fan operates only once for a preselected period of time.

18. The method according to claim 17 further comprising the step of returning the thermostat to the mode of operation that it should be in based on a programmed schedule of the thermostat, after the expiration of the preselected period of time of the temporary fan-on mode.

19. The method according to claim 18 wherein the step of selectively operating the fan in a temporary fan-on mode includes the step of selecting one of a plurality of predetermined periods of time for the fan-on mode.

20. The method according to claim 19 wherein the step of selectively operating the fan in the temporary fan-on mode includes the step of overriding any other mode of operation.

* * * * *